(12) United States Patent
Jagadeesan et al.

(10) Patent No.: US 7,483,701 B2
(45) Date of Patent: Jan. 27, 2009

(54) SYSTEM AND METHOD FOR HANDLING MEDIA IN A SEAMLESS HANDOFF ENVIRONMENT

(75) Inventors: Ramanathan T. Jagadeesan, San Jose, CA (US); Bich T. Nguyen, Los Altos, CA (US); Andrew C. Chung, Fremont, CA (US); Michael A. Ramalho, Sarasota, FL (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 11/056,843

(22) Filed: Feb. 11, 2005

(65) Prior Publication Data

US 2006/0183478 A1    Aug. 17, 2006

(51) Int. Cl.
*H04Q 7/20* (2006.01)
(52) U.S. Cl. .............. 455/436; 455/439; 379/93.31; 348/422
(58) Field of Classification Search ......... 455/436–439; 379/93.31, 93; 704/214, 226; 375/148; 382/253
See application file for complete search history.

(56) References Cited

U.S. PATENT DOCUMENTS

| 5,577,029 A | 11/1996 | Lu et al. ............... 370/54 |
| 5,887,256 A | 3/1999 | Lu et al. ............... 455/426 |
| 5,943,332 A | 8/1999 | Liu et al. .............. 370/342 |
| 5,966,471 A * | 10/1999 | Fisher et al. ........... 382/253 |
| 6,002,679 A | 12/1999 | Liu et al. .............. 370/335 |
| 6,016,318 A | 1/2000 | Tomoike ............... 370/401 |
| 6,141,545 A | 10/2000 | Begeja et al. .......... 455/417 |
| 6,181,928 B1 | 1/2001 | Moon .................. 455/415 |
| 6,405,040 B1 | 6/2002 | Liu et al. .............. 455/435 |
| 6,411,632 B2 | 6/2002 | Lindgren et al. ........ 370/466 |
| 6,539,237 B1 | 3/2003 | Sayers et al. ........... 455/555 |
| 6,546,425 B1 | 4/2003 | Hanson et al. .......... 709/227 |
| 6,611,689 B1 | 8/2003 | Cartigny et al. ........ 455/461 |
| 6,647,426 B2 | 11/2003 | Mohammed ........... 709/238 |
| 6,687,360 B2 | 2/2004 | Kung et al. ........... 379/211.02 |
| 6,748,054 B1 | 6/2004 | Gross et al. ........... 379/88.12 |
| 6,771,953 B1 | 8/2004 | Chow et al. ........... 455/417 |
| 6,807,431 B2 | 10/2004 | Sayers et al. ........... 455/555 |
| 6,826,173 B1 | 11/2004 | Kung et al. ........... 370/352 |
| 6,888,808 B2 | 5/2005 | Jagadeesan et al. ..... 370/328 |
| 6,961,559 B1 | 11/2005 | Chow et al. ........... 455/414.1 |
| 7,058,572 B1 * | 6/2006 | Nemer ................. 704/226 |

(Continued)

OTHER PUBLICATIONS

J. Rosenberg, "A Session Initiation Protocol (SIP) Event Package for Registrations," Network Working Group, RFC 3680, 22 pgs, Mar. 2004.

(Continued)

*Primary Examiner*—Lester Kincaid
*Assistant Examiner*—Michael T Vu
(74) *Attorney, Agent, or Firm*—Baker Botts L.L.P.

(57) ABSTRACT

A method for handling media in a make-before-break handoff between wireless networks is provided that includes communicating with a mobile station to facilitate a session handoff between two call legs of a session. The method also includes identifying a relevant frame of one of the legs, performing a cross correlation operation, generating a delay difference estimate between the two legs, and performing a level difference estimation for the two legs.

19 Claims, 4 Drawing Sheets

U.S. PATENT DOCUMENTS

| | | | | |
|---|---|---|---|---|
| 2001/0046214 | A1 | 11/2001 | Kang | 370/328 |
| 2003/0134638 | A1 | 7/2003 | Sundar et al. | 455/435 |
| 2003/0134650 | A1 | 7/2003 | Sundar et al. | 455/465 |
| 2003/0224795 | A1 | 12/2003 | Wilhoite et al. | 455/445 |
| 2004/0037324 | A1 | 2/2004 | Heubel et al. | 370/493 |
| 2004/0087307 | A1 | 5/2004 | Ibe et al. | 455/436 |
| 2004/0127208 | A1 | 7/2004 | Nair et al. | 455/420 |
| 2004/0146021 | A1 | 7/2004 | Fors et al. | 370/331 |
| 2004/0184513 | A1* | 9/2004 | Lundby et al. | 375/148 |
| 2004/0266426 | A1 | 12/2004 | Marsh et al. | 455/426.2 |
| 2005/0031097 | A1* | 2/2005 | Rabenko et al. | 379/93.31 |
| 2005/0055201 | A1* | 3/2005 | Florencio et al. | 704/214 |
| 2005/0130657 | A1* | 6/2005 | Creamer et al. | 455/436 |

OTHER PUBLICATIONS

M. Garcia-Martin, E. Henrikson, and D. Mills, "Private Header (P-Header) Extensions to the Session Initiation Protocol (SIP) for the 3rd-Generation Partnership Project (3GPP)," Network Working Group, RFC 3455, 29 pgs, Jan. 2003.

Global System for Mobile Communications,"3rd Generation Partnership Project; Technical Specification Group Services and System Aspects; Report on alternative architectures for combining CS Bearers with IMS; Release 6," http://www.3gpp.org, 28 pgs, 2004.

* cited by examiner

SYSTEM AND METHOD FOR HANDLING MEDIA IN A SEAMLESS HANDOFF ENVIRONMENT

TECHNICAL FIELD OF THE INVENTION

The present invention relates generally to network communications and, more particularly, to a system and a method for handling media in a seamless handoff environment.

BACKGROUND OF THE INVENTION

Networking architectures have grown increasingly complex in communications environments. In recent years, a series of protocols and architectures have been developed in order to accommodate a diverse group of end users having various needs. Some of these protocols relate to issues associated with handoffs.

As both public and private network systems grow in size and in sophistication, proper routing and efficient management of communication sessions and data flows becomes even more critical. Advances in technology have resulted in the deployment of various types of wireless networks. However, while most of these wireless networks often provide service to adjacent and/or overlapping physical spaces, the integration of cellular and enterprise network protocols suffer from a number of problems. For example, differences in delay may produce inaudible frames for a given end user. In other cases, differences in amplitude may produce inconsistent volumes or tones for a listener. Accordingly, the ability to provide an effective mechanism to properly process, handoff, and direct communications for an end user seeking to realize the benefits provided by multiple network environments offers a significant challenge to network operators, component manufacturers, and system designers.

SUMMARY OF THE INVENTION

In accordance with some of the teachings of the present invention, techniques for supporting an effective handoff between circuit-switched cellular and packet-switched wireless networks are provided. According to some embodiments, these techniques enable a mobile station to maintain a seamless communication session that is switched between circuit-switched cellular and packet-switched wireless networks. In particular, these techniques can enable a mobile station, alone or in combination with a mobility application, to produce a handoff leg association with a pre-existing call leg and to coordinate the media of the two legs in an optimal fashion.

According to a particular embodiment, a method for handling media in a make-before-break handoff between wireless networks is provided that includes communicating with a mobile station to facilitate a session handoff between two call legs of a session. The method also includes identifying a relevant frame of one of the legs, performing a cross-correlation operation, generating a delay difference estimate between the two legs, and performing a level difference estimation for the two legs.

Embodiments of the invention provide various technical advantages. For example, one or more of the techniques may provide for a seamless handoff to allow a mobile station to freely roam between cellular and enterprise wireless networks. The architecture of the present invention also provides improved voice quality during the switchover between two networks. Further, the configuration of the present invention avoids clicks and other audio glitches that would otherwise be present during the handoff. Additionally, the present invention adjusts the volume for the participating end user, which enhances the end user's experience in the session.

Certain technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
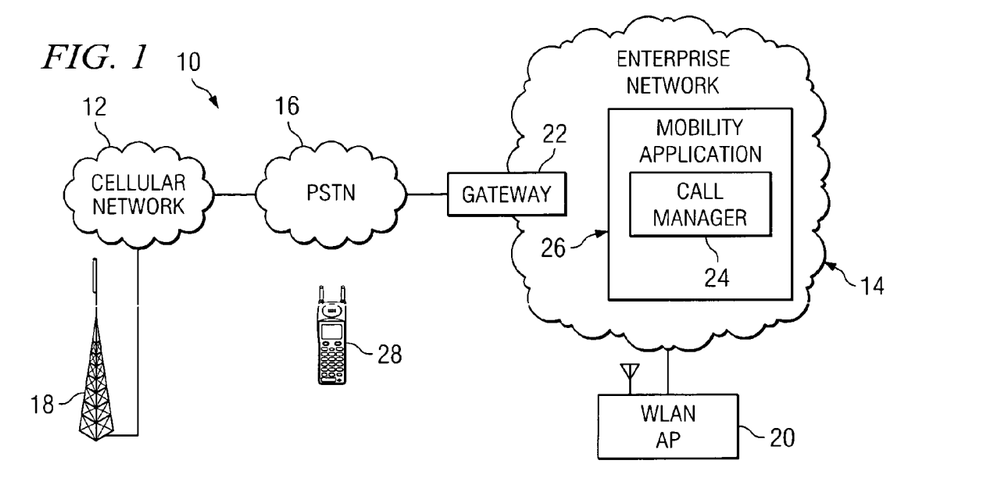
FIG. 1 is a simplified block diagram that illustrates a communication system having elements that support a handoff between cellular and enterprise wireless networks.

FIG. 1 is a simplified block diagram that illustrates a communication system 10 for executing an effective handoff between two call legs, which may be present in a network environment. In addition, communication system 10 provides various techniques for associating related call legs. Some of these operations may relate to make-before-break scenarios. In make-before-break scenarios, a new call (or call) is made (successfully) before the old call (or leg) is torn down.

Communication system 10 comprises a cellular network 12 and an enterprise network 14, which are interconnected through a public switched telephone network (PSTN) 16. One or more base stations 18 are coupled to cellular network 12, and one or more access points 20 are coupled to enterprise network 14. Enterprise network 14 includes a gateway 22, a Call Manager 24 (that is manufactured by Cisco Systems, Inc. of San Jose, Calif.), and a mobility application 26, which can perform one or more operations associated with a handoff server. Communication system 10 also includes mobile station 28, which may communicate with a remote device through cellular network 12 using base station 18 and/or through enterprise network 14 using a wireless local area network access point (WLAN AP) 20. The elements of communication system 10 can operate to permit mobile station 28 to maintain a communication session that is handed between cellular network 12 and enterprise network 14. According to particular embodiments, mobility application 26 and/or mobile station 28 utilize one or more of various private branch exchange (PBX) functions to effect handoff between cellular network 12 and enterprise network 14.

Prior to discussing the following FIGURES, the problems or situations that are being addressed by the proposed flows should be understood. Consider an operation of an example embodiment, where a call associated with mobile station 28 is being properly anchored by mobility application 26. In order to execute a handoff, a new cellular call must be made. Hence, mobile station 28 will make the cellular call over cellular network 12 and to mobility application 26, whereby a switch occurs over to that call leg. Mobility application 26 is handling multiple calls and multiple mobile stations. Hence, mobility application 26 needs to associate that particular call to a given mobile station, particularly in the context of handoff scenarios. A significant obstacle is present in trying to switchover media from a first call (e.g. a circuit-switched cellular call) to a second call (e.g. a VoIP call) in a seamless fashion. This challenge is successfully overcome by the teachings of the present invention, as evidenced by the following FIGURES, which are detailed below.

Communication system 10 executes an effective seamless handoff, whereby the call is anchored in enterprise network 14 (e.g. via mobility application 26). When a call is placed, the call lands on mobility application 26, which recognizes, and is aware of, the call. Hence, when mobile station 28 moves to cellular network 12, mobility application 26 receives a "stealth call" from mobile station 28 and, in response to the stealth call, mobility application 26 collaborates with Call Manager 24 to switch (or to transfer [on the fly]) the call. In a similar, reciprocal fashion, when mobile station 28 moves back to enterprise network 14 it communicates with mobility application 26, which transfers the call from a cellular call leg to a voice over IP (VoIP) call leg.

One problem associated with this operation is that when a call is made to mobility application 26 (which is generally anchoring the call), mobility application 26 needs to coordinate or associate multiple call legs (i.e. match a VoIP call to a cellular call). The situation can be even more challenging when mobile station 28 is roaming.

During handoff, there is a brief period of time (between making the new handoff call leg, and breaking the old call leg), when two media streams flow between the mobile station and the handoff server (or mobility application). Note that, as used herein in this document, the term "media" refers to any information (e.g. voice, music, etc. all of which may be in real-time) that may be present in a communication session. What is desired is to communicate only one optimal audible signal to the end user. The handoff server (or mobility application) and the mobile station must therefore coordinate between a first stream (e.g. implicating VoIP and the WLAN) and a second stream (e.g. implicating a voice gateway and the cellular network). These two paths may be experiencing different delays or different level changes (e.g. amplitude differences, volume differences, etc.). The present invention compensates for these issues by providing an optimal flow for a listener/speaker, who receives a given stream.

Hence, the present invention has two general aspects in addressing these issues. The first aspect deals with delay estimation, which involves executing a cross correlation and picking a suitable peak of the cross correlation. These operations yield an appropriate delay estimate. The second aspect addresses level estimation. The first part may be thought of as a general synchronization, whereby the second part then addresses the volume such that the two call legs have the same loudness. Thus, when the actual switchover occurs, the delay and level differences are adequately compensated for and the end user experiences excellent voice quality.

It should also be noted that there are two independent processes involved in the present invention. In one process, mobility application 26 is receiving a media stream from the remote party (i.e. the other person or device involved in the call) and sending it along two paths to the mobile station. Mobile station 28 will perform the switchover and play out a single stream to the speaker. At relatively the same time, mobile station 28 is communicating what it receives from its microphone along two paths and to the mobility application 26. Mobility application 26 can then repeat the switchover process and send out the switched stream to the remote party.

Hence, communication system 10 offers a seamless handoff, which may be achieved using a make-before-break of VoIP and cellular circuit voice call-legs between a dual-mode mobile station 28 and the handoff server. The potential issues being resolved relate to: 1) possible delays experienced on the cellular call-leg and the VoIP over WLAN call-leg, which may be different; and 2) the speech levels between the two media streams, which could also differ. An arbitrary switchover will simply not be seamless in these cases. In order to achieve the aforementioned seamless handoff of the media, some media processing is required to estimate and to compensate for the delay and the level differences between the streams. In theory, the seamless handoff should be transparent to the end user. The handoff server (i.e. mobility application 26) performs the switchover media processing for the media stream flowing from the mobile station 28 (via mobility application 26) to the remote side. Mobile station 28 performs the switchover media processing for the media stream flowing from the remote side (via mobility application 26) to the mobile station 28.

Cellular network 12 represents communications equipment, including hardware and any appropriate controlling logic, for providing wireless telephony services using cellular protocols and technology. Various cellular protocols and technologies may be used by cellular network 12, including but not limited to global system for mobile communications (GSM), time division multiple access (TDMA), code division multiple access (CDMA), and any other appropriate analog or digital cellular protocol or technology. Furthermore, cellular network 12 may utilize signaling system 7 (SS7) protocol for signaling purposes. Cellular network 12 may include any number of base stations 18, as well as base station controllers, mobile switching centers, and other appropriate communications equipment for use in communicating with mobile station 28 and PSTN 16. Thus, as illustrated, cellular network 12 may couple to base station 18 to receive and transmit wireless signals to and from mobile station 28.

Enterprise network 14 represents communications equipment, including hardware and any appropriate controlling logic, for interconnecting elements coupled to enterprise network 14. Thus, enterprise network 14 may represent a local area network (LAN), a wide area network (WAN), and/or any other appropriate form of network. Furthermore, elements within enterprise network 14 may utilize circuit-switched and/or packet-based communication protocols to provide for wireline telephony services. For example, elements within enterprise network 14 may utilize Internet Protocol (IP). In addition, elements within enterprise network 14 may utilize wireless standards such as the 802.11 family of wireless standards to provide for wireless telephony services. Note that the 802.11 family of wireless standards includes, among others, 802.11a, 802.11b, and 802.11g. Enterprise network 14 may also utilize interactive voice response (IVR). Enterprise network 14 may include any number of wireless network devices 20, gateways 22, Call Managers 24, and other appropriate communications equipment for use in communicating with mobile station 28 and PSTN 16. In the embodiment illustrated, enterprise network 14 includes access point 20, gateway 22, Call Manager 24, and mobility application 26. Access point 20 represents communications equipment, including hardware and any appropriate controlling logic, for providing wireless access to enterprise network 14. Access point 20 may utilize one or more of the 802.11 standards. However, any appropriate wireless standard or protocol may be used.

Gateway 22 represents communications equipment, including hardware and any appropriate controlling logic, for interconnecting enterprise network 14 with cellular network 12 and/or PSTN 16. Gateway 22 may be used to convert communications between different communication protocols. For example, gateway 22 may convert communications received from cellular network 12 in SS7 protocol to any of various other protocols that may be used by enterprise network 14, such as protocols associated with the an integrated services digital network (ISDN) standard in the case of circuit-switched trunking and H.323, session initiation protocol (SIP), or other appropriate protocols in the case of IP-based trunking.

Call Manager 24 represents communications equipment, including hardware and any appropriate controlling logic, for providing telephony services over enterprise network 14. For example, Call Manager 24 may support VoIP communications, using any of various protocols such as SIP, signaling connection control point (SCCP) protocol, media gateway control protocol (MGCP), H.323, and/or any other appropriate protocol for VoIP. Furthermore, Call Manager 24 may act as an IP PBX and support PBX functions, such as hold, park, transfer, redirect, and/or other high level and low level call management features.

Mobility application 26 represents a server in one embodiment of the present invention, but alternatively could be replaced with any other appropriate device (e.g. a router, switch, bridge, gateway, etc.) that facilitates the operations detailed herein. Mobility application 26 includes any suitable collection of hardware, software, and controlling logic to support handoff between cellular network 12 and enterprise network 14. For example, mobility application 26 may, when appropriate, utilize PBX features to effect handoff of a communication session between cellular network 12 and enterprise network 14.

It should also be noted that the internal structure of mobility application 26 and mobile station 28 are malleable and can be readily changed, modified, rearranged, or reconfigured in order to achieve their intended operations as they pertain to the handoff function outlined herein in this document. This includes cross-correlation, peak picking, amplitude compensation, and general synchronization techniques. As identified supra, software and/or hardware may reside in these elements (or in just one) in order to achieve the teachings of the media handling features of the present invention. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structures of mobility application 26 and mobile station 28 in the context of communication system 10 and, accordingly, they should be construed as such.

PSTN 16 represents communications equipment, including hardware and any appropriate controlling logic, through which cellular network 12 and enterprise network 14 may communicate. PSTN 16 may include switches, wireline and wireless communication devices, and any other appropriate equipment for interconnecting cellular network 12 and enterprise network 14. PSTN 16 may include portions of public and private networks providing network transport services between various geographic areas and networks.

Mobile station 28 represents a mobile device, including hardware and any appropriate controlling logic, capable of communicating with remote devices through cellular network 12 and enterprise network 14 and maintaining communication sessions with remote devices during handoff between cellular network 12 and enterprise network 14. Mobile station 28 may communicate through cellular network 12 using base station 18 and through enterprise network 14 using access point 20. Furthermore, mobile station 28 may interact with Call Manager 24 and/or mobility application 26 when appropriate to utilize PBX features to effect handoff between cellular network 12 and enterprise network 14.

In operation, mobile station 28 may initiate and receive telephone calls through cellular network 12 and/or enterprise network 14 to establish communication sessions with remote devices. Note that, as used herein, a remote device refers to any communications device capable of establishing communications sessions with mobile station 28, such as devices located in cellular network 12, enterprise network 14, PSTN 16, or other linked networks. Furthermore, as used herein, a communication session refers to the transfer of voice, video, data, and/or other information between two or more communication devices. For example, according to particular embodiments a communication session may involve a call between two communication devices or a conference call involving two or more communication devices.

At any point in time, mobile station 28 may determine to handoff a communication session from cellular network 12 to enterprise network 14 or from enterprise network 14 to cellular network 12. For example, after establishing a communication session, mobile station 28 may lose or begin to lose connectivity with base station 18 or access point 20. Signal degradation may occur due to various causes. For example, mobile station 28 may begin to lose wireless connectivity due to physical movement. When possible, mobile station 28 may switch between using base station 18 and access point 20 for communications. Moreover, in certain circumstances mobile station 28 may maintain a communication session during handoff between cellular network 12 and enterprise network 14.

Handoff may occur when mobile station 28 travels from an area serviced by cellular network 12 to an area serviced by enterprise network 14. Handoff may also occur in the opposite direction, when mobile station 28 travels from an area serviced by enterprise network 14 to an area serviced by cellular network 12. However, handoff may occur at any other appropriate time. For example, handoff may occur when mobile station 28 is located in an area serviced by both network types due to a predetermined preference of one type of network, due to a spontaneous choice of a user of mobile station 28, or in response to analyzing error rates or other data associated with signaling provided by one or both types of networks. For example, error rates may be associated with signal strengths of base station 18 and access point 20, and may be dependent upon a location of mobile station 28.

After receiving a telephone call intended for mobile station 28, Call Manager 24 and/or mobility application 26 may include itself in a signaling path associated with the resulting communication session, whether the signaling path proceeds through cellular network 12 or enterprise network 14.

Calls placed by mobile station 28 may be anchored in enterprise network 14 by first seeking to utilize enterprise network 14 when a user of mobile station 28 dials a telephone number. To the extent mobile station 28 is in an area serviced by access point 20, any communication session may be anchored in enterprise network 14 by utilizing access point 20. When mobile station 28 is located outside the area serviced by access point 20, mobile station 28 may first couple to mobility application 26 through cellular network 12. For example, cellular network 12 may be provisioned to redirect calls into enterprise network 14. Mobility application 26 may then couple mobile station 28 to the intended remote device by dialing the phone number on behalf of mobile station 28. Alternatively or in addition, mobile station 28 may dial an IVR service provided by enterprise network 14. A user of mobile station 28 may then use the IVR service to dial the target number.

Note that communication system 10 represents one embodiment of a system that supports handoff between cellular and enterprise wireless networks. Various alternative embodiments are possible. For example, while in the illustrated embodiment enterprise network 14 couples to cellular network 12 through PSTN 16 using gateway 22, various other embodiments may include enterprise network 14 coupling to cellular network 12 in other ways. For example, enterprise network 14 may couple to cellular network 12 using a service provider that supports VoIP. Thus, in alternative embodiments, cellular network 12 and gateway 22 may not be included in communication system 10.

Figure 2:
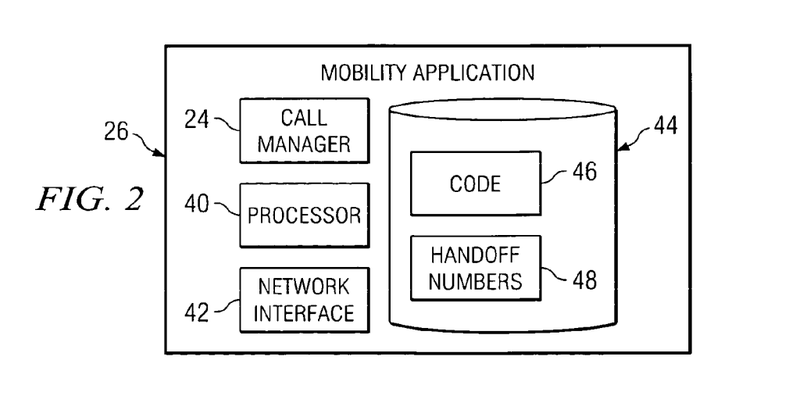
FIG. 2 is a block diagram illustrating functional communication system.

FIG. 2 is a block diagram illustrating functional components of mobility application 26. In the embodiment illustrated, mobility application 26 includes Call Manager 24, as well as a processor 40, a network interface 42, and a memory 44. These functional elements can operate to support handoff of active communication sessions when mobile station 28 roams between cellular network 12 and enterprise network 14.

From a high level perspective, the configuration of the present invention addresses several significant points. One point relates to synchronizing the two streams or legs such that the switchover that occurs is relatively seamless (i.e. a switch on one stream corresponds to a switchover in the other stream). For example, if one stream is experiencing a delay, it would be ideal for words or music segments not to be repeated during the call. In other cases, an end user may hear improper clicking or repeated words on the receiver, which is also undesired. In contrast to these scenarios, the present system allows one appropriate media stream to pick up where the other media stream left off such that this unwanted noise is avoided.

Processor 40 controls the operation and administration of elements within mobility application 26. For example, processor 40 operates to process information received from network interface 42 and memory 44. Processor 40 includes any hardware and/or logic elements operable to control and process information. For example, processor 40 may be a programmable logic device, a microcontroller, and/or any other suitable processing device.

Network interface 42 communicates information to and receives information from devices coupled to enterprise network 14. For example, network interface 42 may communicate with gateway 22, Call Manager 24, and access point 20. Furthermore, network interface 42 may receive information from and transmit information to remote devices as well as mobile station 28. Thus, network interface 42 includes any suitable hardware or controlling logic used to communicate information to or from elements coupled to mobility application 26.

Memory 44 stores, either permanently or temporarily, data and other information for processing by processor 40 and communication using network interface 42. Memory 44 includes any one or a combination of volatile or nonvolatile local or remote devices suitable for storing information. For example, memory 44 may include random access memory (RAM), read only memory (ROM), magnetic storage devices, optical storage devices, or any other suitable information storage device or a combination of these devices. As illustrated, memory 44 may include one or more memory modules, such as code 46 and handoff numbers 48.

Code 46 includes software, executable files, and/or appropriate logic modules capable when executed to control the operation of mobility application 26. For example, code 46 may include executable files capable of supporting handoff between cellular network 12 and enterprise network 14. Code 46 may include instructions to enable mobility application 26 to utilize PBX features. Handoff numbers 48 include E.164 telephone numbers that mobility application 26 may use and/or provide to mobile station 28 for use in effecting handoff between cellular network 12 and enterprise network 14. For example, mobility application 26 may be assigned static E.164 numbers for handoff purposes.

In operation, network interface 42 may receive an indication from mobile station 28 that mobile station 28 intends to utilize a second network, for example cellular network 12. In some embodiments, processor 40 may communicate a handoff number selected from handoff numbers 48 to mobile station 28 through network interface 42.

Note that mobility application 26 may use any appropriate protocol to communicate with other elements of communication system 10. For example, mobility application 26 may utilize Java telephony application programming interface (JTAPI) to interact with Call Manager 24.

While this example includes specific functional components for mobility application 26, mobility application 26 may include any collection and arrangement of components, including some or all of the enumerated functional components, for supporting an effective handoff between cellular network 12 and enterprise network 14. Moreover, mobility application 26 contemplates implementing each of the functional components using any suitable combination and arrangement of hardware and/or logic, and implementing any of the functionalities using a computer program stored on a computer-readable medium. Furthermore, mobility application 26 may be implemented as a stand-alone device, or aspects of mobility application 26 may be distributed among various devices within enterprise network 14. Alternatively, in some embodiments mobility application 26 may be incorporated into Call Manager 24.

Figure 3:
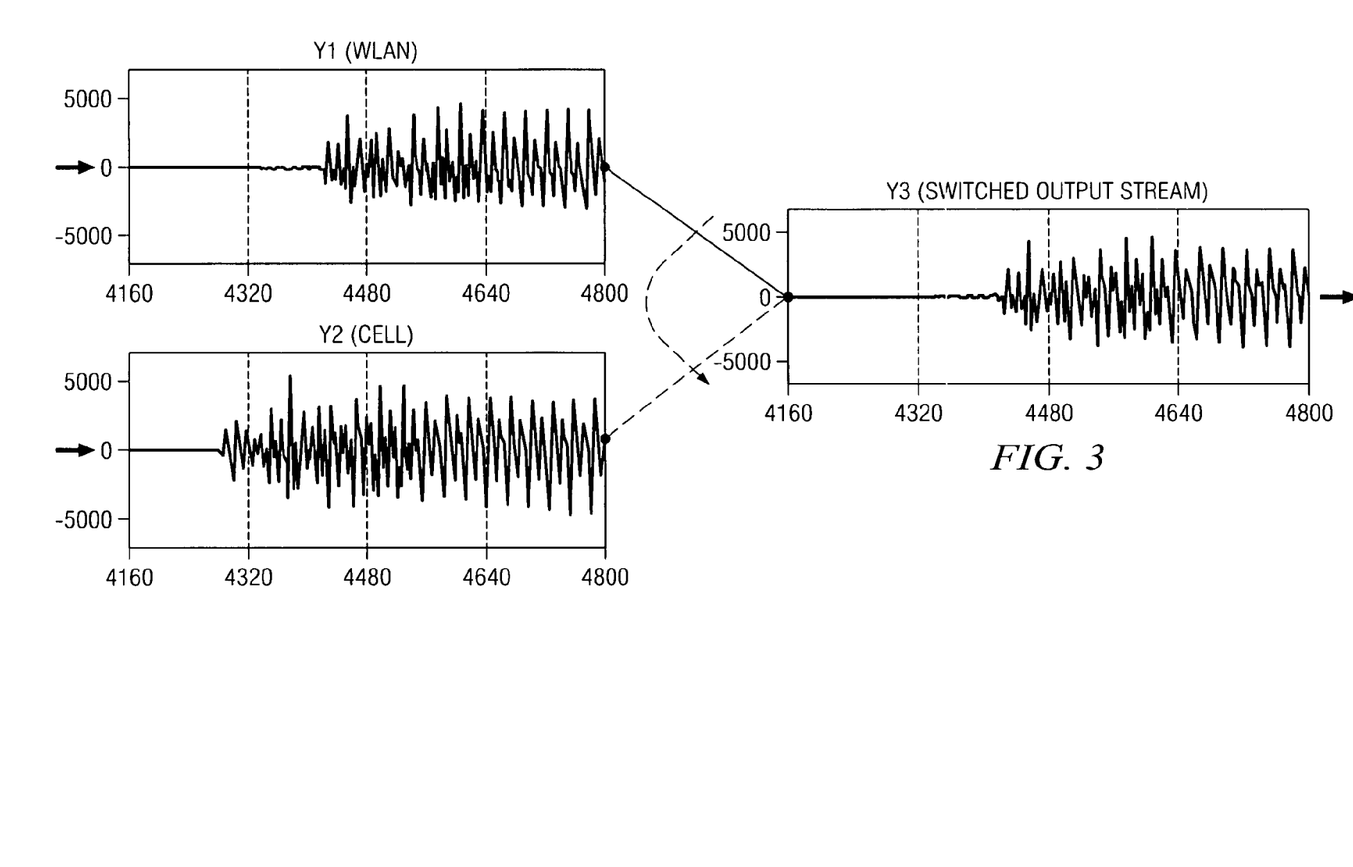
FIG. 3 is a simplified graphical illustration of a media switchover of the communication system.

Turning now to FIG. 3, FIG. 3 is a simplified graphical illustration of the media switchover of the present invention. In this example, the symbol Y1 denotes a voice input (i.e. speech) from the WLAN environment, while the symbol Y2 denotes a voice input from the cellular environment. Time is represented on the X-axis and amplitude is represented on the Y-axis. On the X-axis, a number of speech frames are illustrated (each having a duration of approximately 20 milliseconds). Note that when performing a switchover, the previous frame boundary may not be exactly aligned in most cases.

It is important to recognize that these two streams are simply not synchronized, as evidenced by the graphs. Both legs are associated with the same call, but each leg is different in its timing and amplitude. In this example, YI represent the "old" leg that is currently being heard by the end user, whereby a switch will soon occur such that Y2 will be heard. The synchronization of these two inputs is provided by Y3, which offers a proper signal to be received by the end user.

If the switchover can be done during a silence period, no delay estimation and compensation is needed. This is intuitive, as an absence of voice obviates the need to synchronize (i.e. there is no need to synchronize silence with silence). Voice activity detection (VAD) can be used to detect silence periods, and if silence is detected on both streams, a switchover can be done immediately. The VAD holdover period can be set longer than the max delay difference. Level compensation may be more approximate with the VAD-based approach, since there is no delay estimation and alignment.

Figure 4:
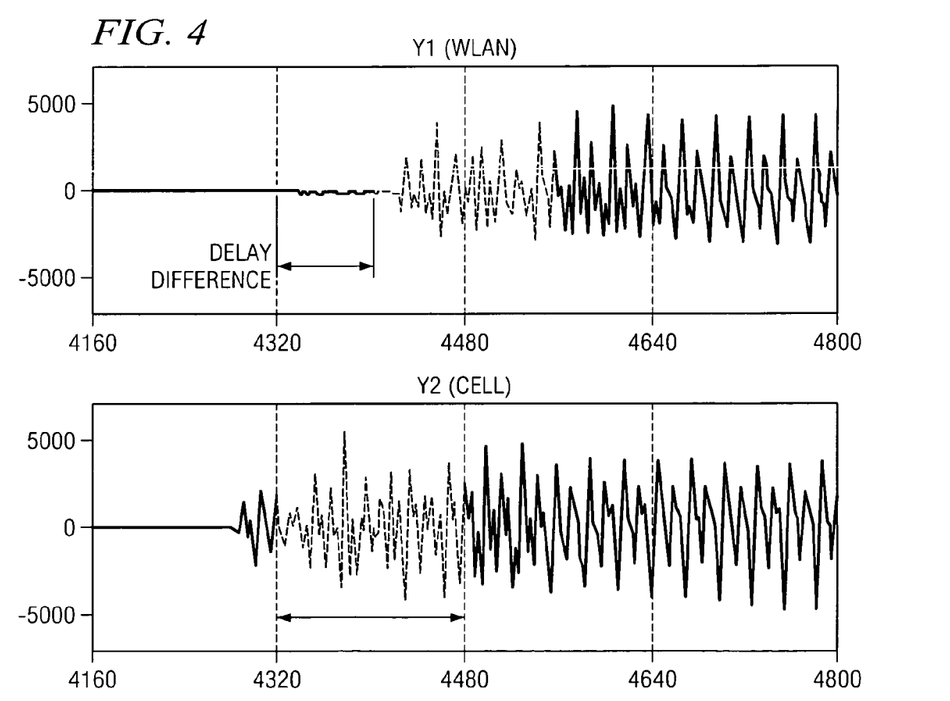
FIG. 4 is a simplified graphical illustration of a delay estimation of the communication system.

Turning to FIG. 4, FIG. 4 is a simplified graphical illustration of a delay estimation of the media switchover of the present invention. FIG. 4 again includes Y1 and Y2, which can be suitably coordinated during a call. Communication system 10 may use cross correlation and peak picking techniques to achieve the seamless handoff. The cross-correlation of Y1 and Y2 will have a maximum amplitude when they are best aligned. The sample shift, which corresponds to the peak of the cross-correlation, gives the estimate of the delay difference.

Delay estimation and compensation can be performed in real-time with minimum added algorithmic delay. As the new stream Y2 arrives, a cross correlation may commence when appropriate samples are buffered for the new stream. Additional buffering delay may be incurred if the frame size is larger than the packet size.

The first step in this process is to determine if this frame is good for cross-correlation. If the frame does not have significant energy (e.g. silence), the delay estimate could be incorrect. A good frame indicator may be based on the frame energy being higher than a given threshold. Once a good frame Y2 is found, a vector dot-product of this may be taken with the buffered samples of the old stream Y1 with a normalized sliding window of the same frame size. The number of samples for which the dot-product is taken generally depends on the maximum delay difference. Note that a buffer of previously received (and played out) samples of the old stream Y1 is maintained in order to perform the cross correlation. The maximum value of the dot-product array is found and the index of the maximum corresponds to the delay difference between the streams.

In the context of the size of the cross-correlation frame, the higher the frame size, the higher the correlation strength: but at a cost of higher algorithmic delay and computational requirements. A frame size of 160 samples (packet size) may be sufficient and does not incur additional algorithmic delay. Other frame sizes can readily be accommodated by the present invention.

Once the two streams are aligned, the ratio of their levels (calculated on the aligned frames) yields the level difference. The levels may be computed as the vector magnitude of the aligned frame (i.e. square root of the vector dot-product of the frame with itself). Level compensation may be applied if the level difference is greater than a threshold (e.g. 3 dB). The gain to be applied to Y2 for level compensation may be given by the equation: $|Y1|/|Y2|$, where Y1 and Y2 are aligned frames. The gain to be applied could be limited to a configured max value (e.g. 6 dB). Once the two streams are aligned and their levels have been compensated, a switchover transition frame is generated using weighted overlap-and-add. A ramp going from 1 to 0 over the frame size may be used for weighting. After the transition frame, frames from the new stream are then used. Other protocols could also be used for these operations and be based on particular needs.

Figure 5:
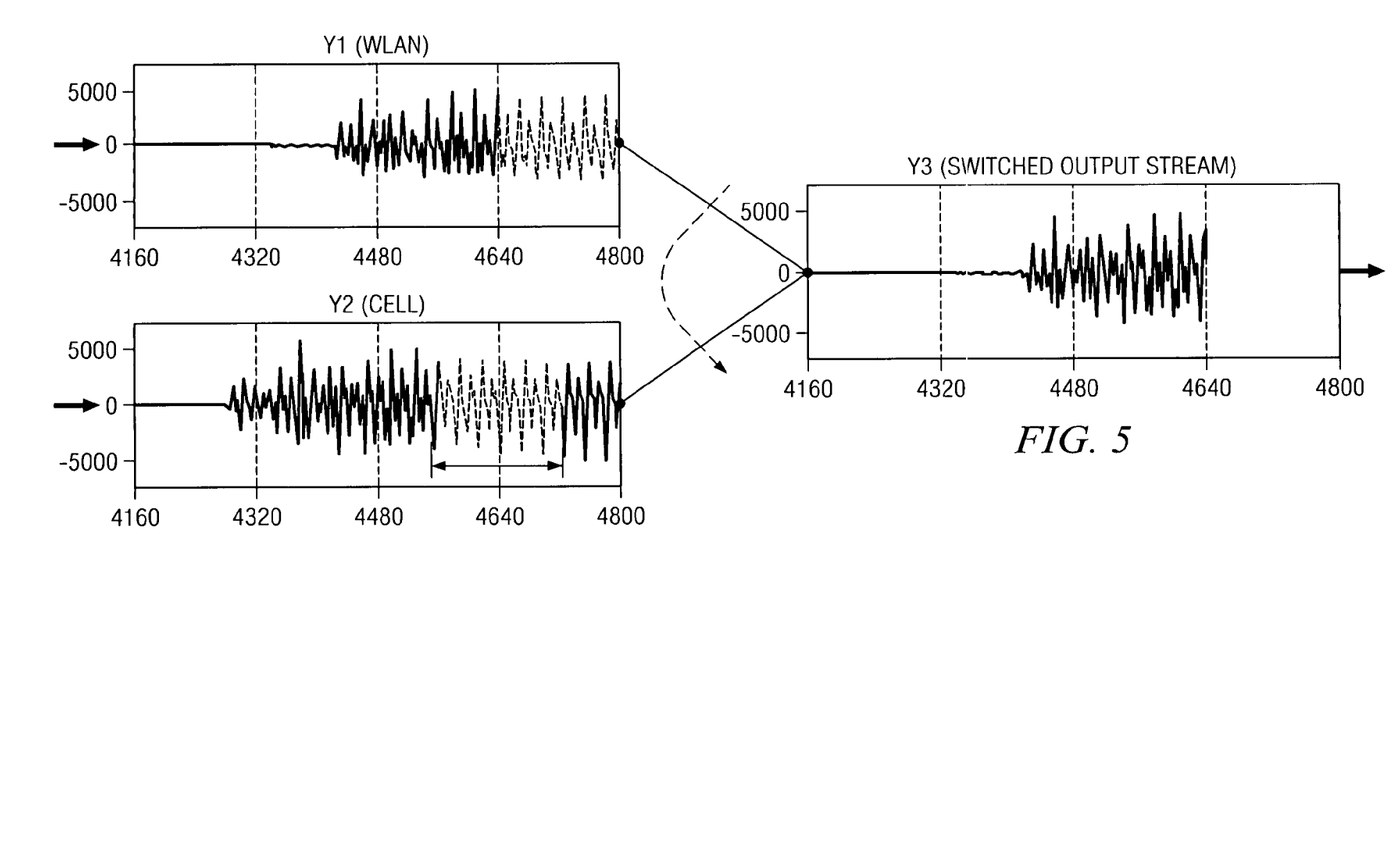
FIG. 5 is another simplified graphical illustration of the media switchover of the communication system.

Turning to FIG. 5, FIG. 5 is a simplified graphical illustration of the media switchover of the present invention. FIG. 5 again includes Y1 and Y2. The scenario or example of FIG. 5 depicts streams being played out from Y1 (the last of which was played out at 4640) to a subsequent point in time. Essentially, the new frames to be played out to the end user from Y2 (from 4640-4800) need to be determined. An appropriate frame is selected from the Y2 stream to accommodate the delay difference and offset. This is illustrated by the two different inputs. Now, these two streams are aligned such that a seamless handoff can be achieved by the system.

Communication system 10 may use modified cross-correlation to achieve its operation: inclusive of dot-product (potentially without normalization). Additionally, a comparison may be made in a squared domain with cross-multiplication of sliding frame energy. In order to reduce computational complexity, the sliding window index for the dot-product may be shifted with a sub-frame shift greater than one sample (e.g. 4 samples). The sub-frame with the highest dot-product magnitude may yield the coarse delay shift estimate. The fine grain dot-product may be performed with 1 sample shift around this coarse estimate. Note that the sub-sampling may need an extra low pass filter.

Note that while these examples include specific functional components for mobile station 28, mobile station 28 may include any collection and arrangement of components, including some or all of the enumerated functional components, for communicating with remote devices using cellular network 12 and/or enterprise network 14 and effecting handoff between cellular network 12 and enterprise network 14. Moreover, mobile station 28 contemplates implementing each of the functional components using any suitable combination and arrangement of hardware and/or logic. Thus, in one embodiment mobile station 28 is a mobile phone. In other embodiments, mobile station 28 may be a personal digital assistant (PDA), laptop computer, or other device operable to establish communications with cellular network 12 and enterprise network 14.

The preceding discussions illustrate particular methods for effecting handoff between cellular network 12 and enterprise network 14. However, these discussions illustrate only exemplary methods of operation. While discussion sometimes focuses on handoff in the enterprise-to-cellular direction, similar techniques may be used to provide for handoff in the cellular-to-enterprise direction. Furthermore, communication system 10 contemplates devices using any suitable techniques, elements, and applications for performing these functions. Thus, many of the steps in the discussions may take place simultaneously and/or in different orders than as shown. In addition, the devices may use methods with additional steps or fewer steps, so long as the methods remain appropriate. Moreover, other devices of communication system 10 may perform similar techniques to support handoff between cellular network 12 and enterprise network 14.

It is critical to note that the stages and steps in the FIGURES illustrate only some of the possible scenarios and operations that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing suitable handoff functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of gateway 22 could be supplanted by bridges, switches, routers or any other suitable devices that are conducive to network communications. In addition the use of DTMF is only one example signaling protocol. DTMF can be supplanted with SMS or any other signaling channel that is available in the cellular or PSTN network.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for handling media in a make-before-break handoff between wireless networks, comprising:
communicating with a mobile station to facilitate a session handoff between two call legs of a session;
identifying a relevant frame of one of the legs;
performing a cross-correlation operation;
generating a delay difference estimate between the two legs; and
performing a level difference estimation for the two legs, wherein the cross-correlation operation includes a vector dot-product operation, wherein the level difference estimation operation includes:
determining an energy level in each frame;
scaling selected frames relative to each other; and
comparing two frames in order to resolve the two frames relative to each other, and wherein the two frames may be amplified or attenuated such that an end user associated with the session hears a similar level of signal.

2. The method of claim 1, wherein the cross correlation operation includes one or more peak picking operations.

3. The method of claim 1, wherein the identifying of the relevant frame operation includes:
selecting a frame with enough energy for a suitable cross correlation operation, and wherein the relevant frame is not associated with silence.

4. The method of claim 1, wherein once the two legs are aligned a switchover transition frame is generated using a weighed overlap-and-add method.

5. The method of claim 1, wherein a voice activity detection (VAD) protocol is executed in conjunction with identifying the relevant frame.

6. A system for handling media in a make-before-break handoff between wireless networks, comprising:
a mobility application operable to communicate with a mobile station to facilitate a session handoff between two call legs of a session, wherein during the session handoff the mobility application is operable to:
identify a relevant frame of one of the legs;
perform a cross-correlation operation;
generate a delay difference estimate; and
perform a level difference estimation, wherein the cross-correlation operation includes a vector dot-product operation, wherein the level difference estimation operation includes:
determining an energy level in each frame;
scaling selected frames relative to each other; and
comparing two frames in order to resolve the two frames relative to each other, and wherein the two frames may be amplified or attenuated such that an end user associated with the session hears a similar level of signal.

7. The system of claim 6, wherein the cross correlation includes one or more peak picking operations.

8. The system of claim 6, wherein the identifying of the relevant frame operation includes selecting a frame with enough energy for a suitable cross correlation operation, and wherein the relevant frame is not associated with silence.

9. The system of claim 6, wherein once the two legs are aligned a switchover transition frame is generated using a weighed overlap-and-add protocol.

10. The system of claim 6, wherein a voice activity detection (VAD) protocol is executed in conjunction with identifying the relevant frame.

11. Software for handling media in a make-before-break handoff between wireless networks, the software being embodied in a computer readable medium and comprising computer code such that when executed is operable to:
communicate with a mobile station to facilitate a session handoff between two call legs of a session;
identify a relevant frame of one of the legs;
perform a cross-correlation operation;
generate a delay difference estimate between the two legs; and
perform a level difference estimation for the two legs, wherein the cross-correlation operation includes a vector dot-product operation, wherein the level difference estimation operation includes:
determining an energy level in each frame;
scaling selected frames relative to each other; and
comparing two frames in order to resolve the two frames relative to each other, and wherein the two frames may be amplified or attenuated such that an end user associated with the session hears a similar level of signal.

12. The medium of claim 11, wherein the cross correlation operation includes one or more peak picking operations.

13. The medium of claim 11, wherein the identifying of the relevant frame operation includes:
selecting a frame with enough energy for a suitable cross correlation operation, and wherein the relevant frame is not associated with silence.

14. The medium of claim 11, wherein a buffer of previous frames on the first call leg is maintained to facilitate the cross-correlation operation.

15. A system for handling media in a make-before-break handoff between wireless networks, comprising:
a mobile station operable to communicate with a mobility application to facilitate a session handoff between two call legs of a session, wherein during the session handoff a relevant frame of one of the legs is identified, a cross-correlation operation is performed, a delay difference estimate is generated, and a level difference estimation is performed for the session, wherein the cross-correlation operation includes a vector dot-product operation, wherein the level difference estimation operation includes:

determining an energy level in each frame;

scaling selected frames relative to each other; and comparing two frames in order to resolve the two frames relative to each other, and wherein the two frames may be amplified or attenuated such that an end user associated with the session hears a similar level of signal.

16. The system of claim 15, wherein the cross correlation includes one or more peak picking operations.

17. The system of claim 15, wherein the identifying of the relevant frame operation includes selecting a frame with enough energy for a suitable cross correlation operation, and wherein the relevant frame is not associated with silence.

18. The system of claim 15, wherein once the two legs are aligned a switchover transition frame is generated using a weighed overlap-and-add protocol.

19. The system of claim 15, wherein a voice activity detection (VAD) protocol is executed in conjunction with identifying the relevant frame.

* * * * *